(12) United States Patent
Menkhoff

(10) Patent No.: US 10,374,861 B2
(45) Date of Patent: Aug. 6, 2019

(54) APPARATUSES AND METHODS FOR GENERATING A RADIO FREQUENCY SIGNAL, A MODULATOR, A CONTROLLER FOR A MODULATOR, AND A METHOD FOR CONTROLLING A MODULATOR

(71) Applicant: Intel IP Corporation, Santa Clara, CA (US)

(72) Inventor: Andreas Menkhoff, Oberhaching (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/752,261

(22) PCT Filed: Sep. 25, 2015

(86) PCT No.: PCT/IB2015/057376
§ 371 (c)(1),
(2) Date: Feb. 13, 2018

(87) PCT Pub. No.: WO2017/051217
PCT Pub. Date: Mar. 30, 2017

(65) Prior Publication Data
US 2019/0028319 A1    Jan. 24, 2019

(51) Int. Cl.
*H04L 27/36*    (2006.01)
*H04L 27/00*    (2006.01)
*H04B 1/04*    (2006.01)

(52) U.S. Cl.
CPC ............... *H04L 27/36* (2013.01); *H04B 1/04* (2013.01); *H04L 27/0008* (2013.01)

(58) Field of Classification Search
CPC .................................. H04L 27/36; H04B 1/04
USPC ................................................... 375/295, 298
See application file for complete search history.

(56) References Cited

U.S. PATENT DOCUMENTS

| 8,111,776 | B1 | 2/2012 | Crawford | |
| 8,867,665 | B2* | 10/2014 | Dufrene | H03C 5/00 |
| | | | | 375/295 |
| 2003/0216126 | A1 | 11/2003 | Ballantyne | |
| 2009/0074106 | A1 | 3/2009 | See et al. | |
| 2011/0291756 | A1* | 12/2011 | Rofougaran | H03F 3/24 |
| | | | | 330/129 |
| 2012/0114075 | A1* | 5/2012 | Shimada | H03F 1/0227 |
| | | | | 375/298 |
| 2012/0140852 | A1* | 6/2012 | Kato | H03F 1/30 |
| | | | | 375/298 |
| 2013/0259152 | A1* | 10/2013 | Simon | H04L 27/00 |
| | | | | 375/295 |
| 2013/0308060 | A1 | 11/2013 | Fay | |

* cited by examiner

*Primary Examiner* — Don N Vo
(74) *Attorney, Agent, or Firm* — 2SPL Patent Attorneys PartG mbB

(57) ABSTRACT

An apparatus for generating a radio frequency signal is provided. The apparatus includes a modulator configured to generate the radio frequency signal based on an input signal. Further, the apparatus includes a controller configured to control the modulator to generate the radio frequency signal using polar modulation, if the input signal has a first characteristic. The controller is configured to control the modulator to generate the radio frequency signal using quadrature modulation, if the input signal has a different second characteristic.

23 Claims, 7 Drawing Sheets

300

APPARATUSES AND METHODS FOR GENERATING A RADIO FREQUENCY SIGNAL, A MODULATOR, A CONTROLLER FOR A MODULATOR, AND A METHOD FOR CONTROLLING A MODULATOR

FIELD

Examples relate to wireless transmitter technology. In particular, some examples relate to apparatuses and methods for generating a Radio Frequency (RF) signal. Some examples relate a modulator for generating a RF signal. Further examples relate to a controller for a modulator, and a method for controlling a modulator.

BACKGROUND

Modern wireless transmitters (e.g. for cellular communication) are dominated by two architectures: I/Q transmitters and polar transmitters.

I/Q transmitters and polar transmitters have their individual benefits and drawbacks. For example, a polar transmitter commonly has a higher efficiency compared to an I/Q transmitter. However, a polar transmitter using a Digital-to-Time Converter (DTC) has a high current consumption, and polar transmitter using a modulated Digitally Controlled Oscillator (DCO) has a wide instantaneous frequency modulation range. The wide instantaneous frequency modulation range may be compensated at the expense of an increased Error Vector Magnitude (EVM).

Hence, there may be a desire for a transmitter avoiding the drawbacks of the previous architectures while maintaining their benefits.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
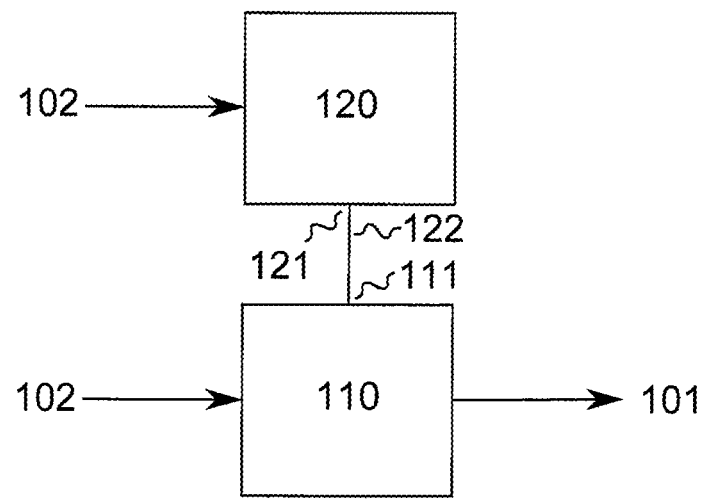
FIG. 1 illustrates an example of an apparatus for generating a RF signal.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent,", to name just a few examples).

The terminology used herein is for the purpose of describing particular examples is not intended to be limiting for further examples. Whenever a singular form such as "a," "an" and "the" is used and using only a single element is neither explicitly or implicitly defined as being mandatory, further examples may also plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (EUTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In some examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates an apparatus 100 for generating a RF signal 101. The apparatus 100 comprises a modulator 110 generating the RF signal 101 based on an input signal 102. The input signal 102 contains information related to the RF signal 101. For example, the input signal 102 may be a baseband signal or may be a signal that is related to a baseband signal. Further, the apparatus 100 comprises a controller 120 for controlling the modulator 110.

The controller 120 comprises electronic circuitry to control the modulator 110 to generate the RF signal 101 using polar modulation, if the input signal 102 has a first characteristic. If the input signal 101 has a different second characteristic, the electronic circuitry of the controller 120 controls the modulator 110 to generate the RF signal using quadrature modulation. For controlling the modulator 120, the controller 110 comprises an output 121 for supplying a control signal 122 for the modulator 110, wherein the control signal 122 indicates the desired modulation method, i.e., the modulation method that has been determined by the controller 120 based on the input signal 102.

In other words, the modulator 110 comprises electronic circuitry to generate the RF signal 101 using polar modulation in a first mode of operation, and to generate the RF signal 101 using quadrature modulation in a second mode of operation. The modulator 110 comprises an input 111 for receive the control signal 122 which is indicative of either the first or second mode (i.e. the desired mode) of operation of the modulator 110.

The first and second characteristics may be characteristics of the input signal 102 itself, or desired characteristics of the resulting RF signal 101 since the RF signal 101 is based on the input signal 102, i.e., the first and second characteristics may be desired characteristics of the resulting RF signal 101 which are related to an information of the input signal 102. The first and second characteristics of the input signal 102 may, e.g., be related a bandwidth of the input signal 102 or a desired bandwidth of the resulting RF signal 101. For example, if the desired bandwidth of the RF signal 101 is smaller than a threshold value, polar modulation may be used, and, if the desired bandwidth of the RF signal 101 is greater than the threshold value, quadrature modulation may be used. In other words, the controller 120 may control the modulator 110 to generate the RF signal 101 using polar modulation for low bandwidths of the RF signal 101, and to generate the RF signal 101 using quadrature modulation for high bandwidths of the RF signal 101. Alternatively, the controller 120 may control the modulator 110 based on the desired number of allocated resource blocks in the resulting RF signal 101. For example, if the desired number of allocated resource blocks is smaller than a threshold value, polar modulation may be used, and, if the number of allocated resource blocks is greater than the threshold value, quadrature modulation may be used. In other words, the controller 120 may control the modulator 110 to generate the RF signal 101 using polar modulation for a low number of allocated resource blocks, and to generate the RF signal 101 using quadrature modulation for a high number of allocated resource blocks. Moreover, the controller 120 may control the modulator 110 based on the desired output power of the resulting RF signal 101. For example, if the desired output power of the RF signal 101 is smaller than a threshold value, quadrature modulation may be used, and, if the desired output power of the RF signal 101 is greater than the threshold value, polar modulation may be used. In other words, the controller 120 may control the modulator 110 to generate the RF signal 101 using polar modulation for high output powers of the RF signal 101, and to generate the RF signal 101 using quadrature modulation for low output powers of the RF signal 101. Alternatively, the controller 120 may control the modulator 110 based on a number of frequency bands comprised by the resulting RF signal 101. For example, if the resulting RF signal 101 comprises more than one frequency band, quadrature modulation may be used, and, if the resulting RF signal 101 comprises only one frequency band, polar modulation may be used.

As indicated above, the second characteristic may in some examples be the negation of the first characteristic.

In some examples, the first characteristic may indicate that a sample of the input signal 102 is located in a first region of a constellation diagram, and the second characteristic may indicate that the sample is located in a different second region of the constellation diagram. Further details of these aspects are discussed in the following with respect to FIG. 2.

The apparatus 100 comprising the modulator 110, which is capable of polar and quadrature modulation, allows to generate the RF signal 101 using the modulation technique that is most advantageous. Accordingly, a signal quality of the resulting RF signal 101 may be improved compared to conventional transmitter architectures supporting either polar or quadrature modulation. Moreover, the hardware requirements for further components of the apparatus 100 may be relaxed. For example, a frequency range of a DCO providing a LO signal for the modulator 110 for the RF signal generation may be smaller compared to a conventional transmitter capable of only polar modulation. Accordingly, also an EVM of the resulting RF signal may be lowered compared to a polar transmitter. Compared to a transmitter capable of only quadrature modulation, an overall efficiency of the apparatus 100 may be increased since the apparatus 100 may generate the RF signal 101 using polar modulation in some case—polar modulation being more efficient than quadrature modulation.

The apparatus 100 may comprise one or more additional optional features corresponding to one or more aspects of the proposed concept or one or more examples described below. In particular, further details of the first and second characteristics are described with respect to FIG. 2.

Speaking more general, some examples of the proposed concept relate to a means for generating a radio frequency signal. The means comprises a means for generating the radio frequency signal based on an input signal, and a means for controlling the means for generating the radio frequency signal to generate the radio frequency signal using polar modulation, if the input signal has a first characteristic. The means for controlling is configured to control the means for generating the radio frequency signal to generate the radio frequency signal using quadrature modulation, if the input signal has a different second characteristic.

The means for generating a radio frequency signal may be implemented by an apparatus for generating a radio frequency signal described above or below (e.g. FIG. 1). The means for generating the radio frequency signal may be implemented by a modulator described above or below (e.g. FIG. 1). The means for controlling may be implemented by controller described above or below (e.g. FIG. 1).

Further partitioned, some examples of the proposed concept relate to a means for generating a radio frequency signal, which comprises a means for generating the radio frequency signal using polar modulation in a first mode of operation, and for generating the radio frequency signal using quadrature modulation in a second mode of operation. The means further comprises a means for receiving a control signal indicative of the first or second mode of operation of the means for generating a radio frequency signal. The means for generating a radio frequency signal may be implemented by a modulator described above or below (e.g. FIG. 1). The means for generating the radio frequency signal using polar modulation or quadrature modulation may be implemented by electronic circuitry described above or below (e.g. FIG. 1). The means for receiving may be implemented by an input described above or below (e.g. FIG. 1).

Further, some examples of the proposed concept generally relate to a means for controlling a modulator, which comprises a means for controlling the modulator to generate the radio frequency signal based on an input signal using polar modulation, if the input signal has a first characteristic, and to control the modulator to generate the radio frequency signal using quadrature modulation, if the input signal has a different second characteristic. The means further comprises a means for supplying a control signal for the modulator, the control signal indicating the desired modulation method. The means for means for controlling may be implemented by controller described above or below (e.g. FIG. 1). The means for means for controlling the modulator to generate the radio frequency signal using polar modulation or quadrature modulation may be implemented by electronic circuitry described above or below (e.g. FIG. 1). The means for supplying may be implemented by an output described above or below (e.g. FIG. 1).

As indicated above, the first characteristic may indicate that a sample of the input signal 102 for the apparatus 100 illustrated in FIG. 1 is located in a first region of a constellation diagram, and the second characteristic may indicate that the sample is located in a different second region of the constellation diagram. An example for defining first and second regions in a constellation diagram is illustrated in FIG. 2.

Figure 2:
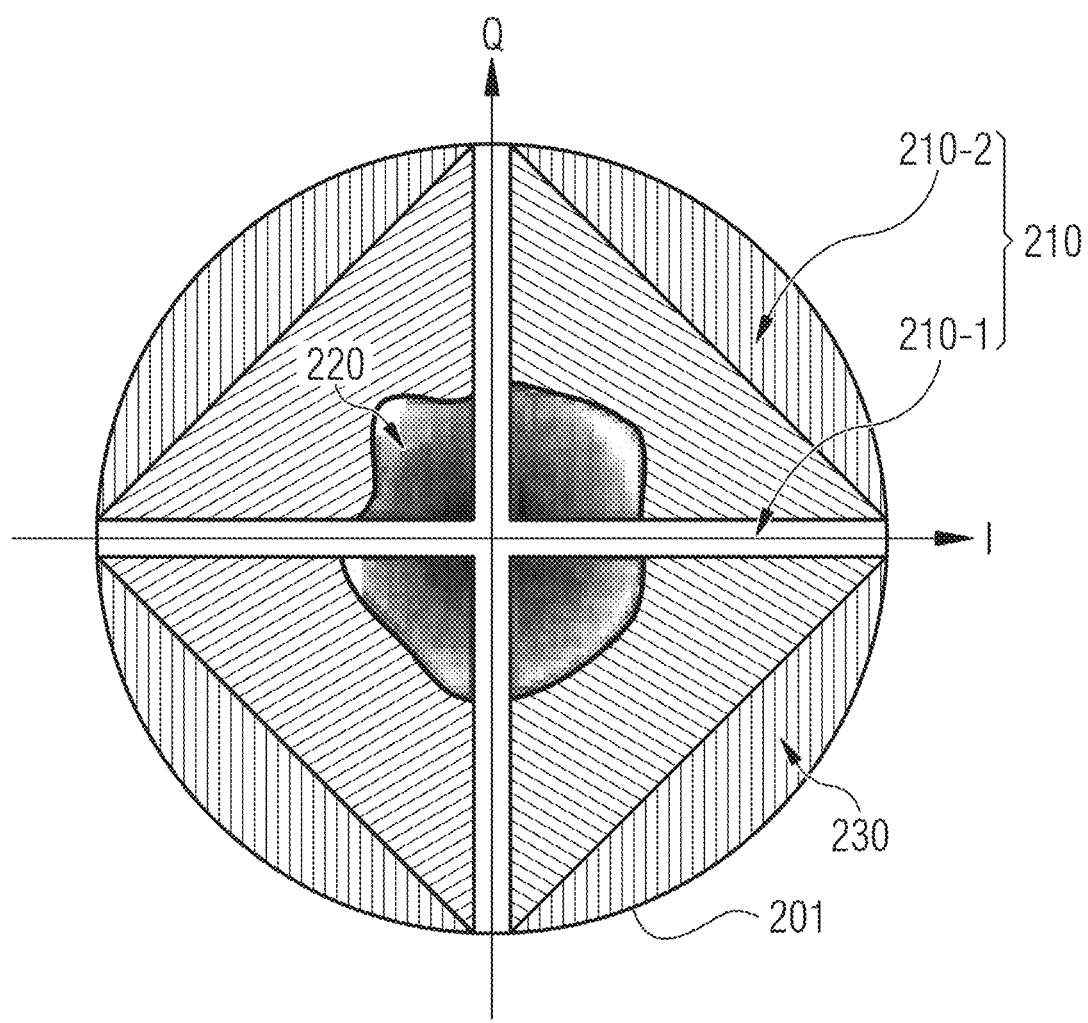
FIG. 2 illustrates an example of a constellation diagram.

In FIG. 2, a constellation diagram 200 is illustrated. The constellation diagram 200 is spanned by a first axis I representing an in-phase component and an orthogonal second axis Q representing a quadrature component. Hence, for the input signal 102 having a complex I/Q representation, a sample of the signal may be directly illustrated in the constellation diagram 200. For the input signal 102 having a polar representation, a sample of the signal may be illustrated in the constellation diagram 200 by calculating respective complex I/Q coordinates from the polar coordinates of the sample. The constellation diagram 200 is delimited by line 201 illustrating the space of possible samples or symbols within the constellation diagram.

The constellation diagram 200 comprises a first region 210. The first region 210 comprises a first sub-region 210-1, which comprises the first axis I and the second axis Q of the constellation diagram 200. As indicated in FIG. 2, the first sub-region 210-1 may in some examples not only comprise the first and second axes I, Q of the constellation diagram 200. Furthermore, the first sub-region 210-1 may comprise the neighboring area of the first and second axes I, Q. In other words, a sample in the first sub-region 210-1 of the first region 210 may have maximum distance to one of the first and second axes I, Q that is smaller than a threshold value. The first region 210 is a region, where the RF signal can be efficiently generated using polar modulation.

Further, the constellation diagram 220 comprises a second region 220. The second region 220 corresponds to instantaneous frequencies of the RF signal having a frequency deviation from a desired carrier frequency of the RF signal that is greater than a second threshold value. In other words, the second region 220 corresponds to high instantaneous frequency deviations of the RF signal from the desired carrier frequency. Accordingly, polar modulation is not desired for this region since a DCO for providing a respective LO signal for the modulation would have to cover a wide frequency range. Hence, it may be advantageous to use quadrature modulation for the second region 220. The second region 220 may be centered at the origin of the constellation diagram 200 as illustrated in FIG. 2. The second region 220 may be delimited by an irregular contour as illustrated in FIG. 2. However, in general, any contour is possible. For example, a maximum distance of a sample in the second region 220 to the origin of the constellation diagram 200 may be smaller than a first threshold value. In other words, the contour for delimiting the second region 220 may be circular.

The constellation diagram 200 comprises a third region 230. A sample in the third region 230 cannot be processed by a modulator using an efficient Digital-to-Analog Converter (DAC) having a minimum number of DAC cells, which can be shared for generating a component of the RF signal that is related to the in-phase component, and a component of the RF signal that is related to the quadrature component. In other words, if a sample is located at the first axis I, all DAC cells may be used for the in-phase component, and, if a sample is located at the second axis Q, all DAC cells may be used for the quadrature component. If a sample has angle of 45° to both axes I, Q, half of the DAC cells may be used for the for in-phase component, and the other half of the DAC cells for the quadrature component. Accordingly, a maximum distance to the origin (radius) for that sample is $0.5^2 + 0.5^2 = 0.5$ for a DAC with the minimum amount of DAC cells (assuming that I and Q are at max. 1). For generating a RF signal based on a sample in the third region 230, the modulator may be provided with a DAC having more DAC cells.

FIG. 2 further illustrates a second sub-region 210-2 of the first region 210. The second subregion 210-2 of the first region 210 corresponds to instantaneous frequencies of the RF signal having a frequency deviation from the desired carrier frequency of the RF signal that is smaller than the second threshold value. That is, the second sub-region 210-2 of the first region 210 corresponds to small instantaneous frequency deviations of the RF signal from the desired carrier frequency. Since polar modulation generally has a higher efficiency compared to quadrature modulation, it may be beneficial to use polar modulation for a sample in the second sub-region 210-2. As illustrated in FIG. 2, the second sub-region 210-2 may surround the second region 220. The second sub-region 210-2 and the second region 220 may be separated by an irregular contour as illustrated in FIG. 2. In some examples, the second sub-region 210-2 and the second region 220 may be separated by a circular contour as indicated above. Accordingly, a minimum distance of a sample in the second sub-region 210-2 to the origin of the constellation diagram 200 may be greater than the first threshold value (corresponding to the radius of the circle separating the second sub-region 210-2 and the second region 220).

To put in a nutshell, a transmitter may in normal operation mode alternate between polar modulation and I/Q (quadrature) modulation. For example, the transmitter may mainly use polar modulation due to its high efficiency and may time after time use I/Q modulation for, e.g., some nanoseconds, some tens of nanoseconds, some hundreds of nanoseconds, or some microseconds. For high amplitudes and low instantaneous frequency deviations from a desired carrier frequency (channel frequency), the transmitter may be operated in polar mode. For low amplitudes and high instantaneous frequency deviations, the transmitter may be operated I/Q mode. Regarding FIG. 2, this may be translated to different regions of the constellation diagram. An inner (second) region 220, where the transmitter may be operated in I/Q mode. For quadrature modulation, the transmitter has a lower efficiency than for polar modulation. Accordingly, the second region 220 may be chosen small. On the other hand, this region corresponds to high instantaneous frequency deviations of the RF signal. Increasing the second region 220 for the quadrature modulation may therefore simplify polar transmission in other regions of the constellation diagram since a smaller instantaneous frequency range of the RF signal may be required for polar modulation. Hence, a trade-off between both scenarios may be considered. In the first (polar) region 210-1 along the first and second axes I, Q, the transmitter may be operated in polar mode. The third region 230 may for an efficient modulator with a minimum DAC be not reachable. The second sub-region 210-1 may be an undesired (unwanted) region for quadrature modulation due to reduced efficiency, accordingly polar modulation may be used for a sample in this region.

Another important aspect is the changeover from quadrature to polar modulation and vice versa. Starting with a sample within the first sub-region 210-1 of the first region, one of the subsequent samples may be in the second region 220. Accordingly, the modulator 110 of the apparatus 100 is controlled to change over from polar modulation to quadrature modulation. The transition from quadrature modulation to polar modulation may be rather simple for the case that the first sample succeeding quadrature modulation is located in the first sub-region 210-1. Accordingly, the modulator 110 of the apparatus 100 is controlled to change over from quadrature modulation to polar modulation. However, if the first sample succeeding quadrature modulation is located in the second sub-region 210-2, the transition may require further efforts. In particular, polar modulation may not be performed in an efficient manner in the second sub-region 210-2 itself. Efficient polar modulation may only be performed in the first sub-region 210-1 (e.g. on one of the first and second axes I, Q).

Accordingly, two options may be considered: As a first option, the second sub-region 210-2 may be associated to quadrature modulation instead of polar modulation. In this case, polar modulation would take place only in the first sub-region 210-1, but with high efficiency. However, the efficiency for quadrature modulation is low in the second sub-region 210-1 as described above. Accordingly, an overall efficiency of a modulator or a transmitter may be low, which is undesirable.

In a second option, the constellation diagram 200 may be rotated, so that the last sample of quadrature modulation is on one of the first and second axes I, Q. Accordingly, efficient polar modulation for the next sample may be assured. Therefore, a high overall efficiency of a modulator or a transmitter may be assured.

In other words, in a traditional I/Q transmitter the LO may be set to channel (carrier) frequency and the amplitude of the DAC for the in-phase component and the DAC for the quadrature component may be varied. According to the proposed concept, a transmitter may (quickly) alternate between I/Q and polar modulation. The transition from polar mode to I/Q mode may be simple since, starting from one of the first and second axes I, Q, one may move inside I/Q area. The transition from I/Q to polar mode may be more complicated since one may reach a certain instantaneous frequency (or radius) most likely somewhere in the I/Q domain (i.e. the second sub-region 210-2) and very seldom directly on one of the first and second axes I, Q. However, for efficient polar modulation a location of the sample on one of the axes is mandatory—otherwise the benefits of polar modulation are lost. Hence, one may try to end up at one of the axes I, Q at the end of the I/Q mode (i.e. the last sample of the I/Q mode should be located on one of the axes I, Q). A first solution may be to increase the range of a DAC of the modulator or transmitter so that the DAC may also cover the forbidden (third) region 230 in FIG. 2. Then, one may change to polar mode if one crosses one of the axes I, Q. This may need some time since for, e.g., the transition from (1,1) to (−1,−1) in the constellation diagram, one doesn't cross the axes. Furthermore, this solution has less efficiency. In an alternative solution, one may end up on one of the axes by (effectively) rotating the I/Q coordinate system, i.e., by (effectively) rotating the constellation diagram. For example, this may be done by instantaneous frequency modulation.

Figure 3:
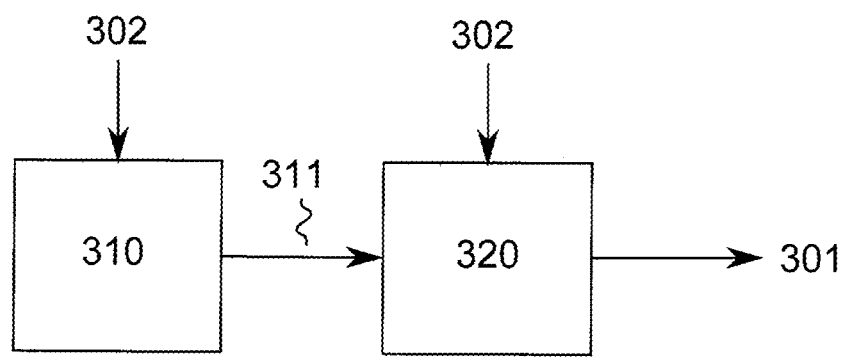
FIG. 3 illustrates another example of an apparatus for generating a RF signal.

An approach for (effectively) rotating the constellation diagram is presented in FIG. 3, which illustrates an apparatus 300 for generating a RF signal 301.

The apparatus 300 comprises a modulator 320 configured to generate the RF signal 301 based on a plurality of samples of an input signal 302. The modulator 320 is controlled by a control unit 310, which supplies a control signal 311 to the modulator 320. The control unit 310 controls the modulator 320 to generate the RF signal 301 using quadrature modulation for a first sequence of the samples of the input signal 302. The control unit 310 further controls the modulator 320 to generate the RF signal 301 using polar modulation for a second sequence of the samples of the input signal 302. The second sequence of the samples directly succeeds the first sequence of the samples.

A deviation of a desired carrier frequency of the RF signal 301 to a calculated instantaneous frequency of the RF signal 301 for each sample of the second sequence is smaller than a threshold value. In contrast, the deviation of the desired carrier frequency of the RF signal 301 to the calculated instantaneous frequency of the RF signal 301 for each sample of the first sequence is greater than the threshold value. In other words, the samples of the first sequence have great instantaneous frequency deviations to the carrier frequency of the RF signal 301, whereas the samples of the first sequence have small instantaneous frequency deviations to the carrier frequency of the RF signal 301. For separating between the first and second sequence, one may, e.g., write the plurality of input samples into a ring buffer and determine at what sample the instantaneous frequency is below a threshold indicating the change over from quadrature to polar modulation and vice versa.

The control unit 310 further calculates a phase of the last sample of the first sequence. In other words, the control unit 310 may calculate an angle of the last sample of the first sequence with respect to one of the first and second axes in the constellation diagram. Based on the calculated phase of the last sample of the first sequence, the control unit 310 calculates a carrier frequency of the RF signal 301 for the first sequence. The calculated carrier frequency of the RF signal 301 for the first sequence of the samples may have a frequency offset to the desired carrier frequency of the RF signal 301. The frequency offset of the carrier frequency for the RF signal 301 corresponds to an effective rotation of the constellation diagram. Accordingly, by determining the phase of the last sample of the first sequence, the frequency offset for the carrier frequency may be calculated such that the last sample of the first sequence is located on one of the first and second axes I, Q in the constellation diagram.

In other words, the input samples may be written into a ring buffer and one may look at what sample instance the instantaneous frequency is decreased such (or a radius of the sample in the constellation diagram is increased such) that one may switch over to polar mode. Then, an angle (or period-shift) of this sample instance may be calculated. From these information (angle and available samples) one may calculate the frequency offset in I/Q mode so that the transition sample from I/Q to polar mode lies exactly on one of the axes. Hence, a very good efficiency may be achieved for the trade-off of a frequency offset in I/Q mode.

Figure 4:
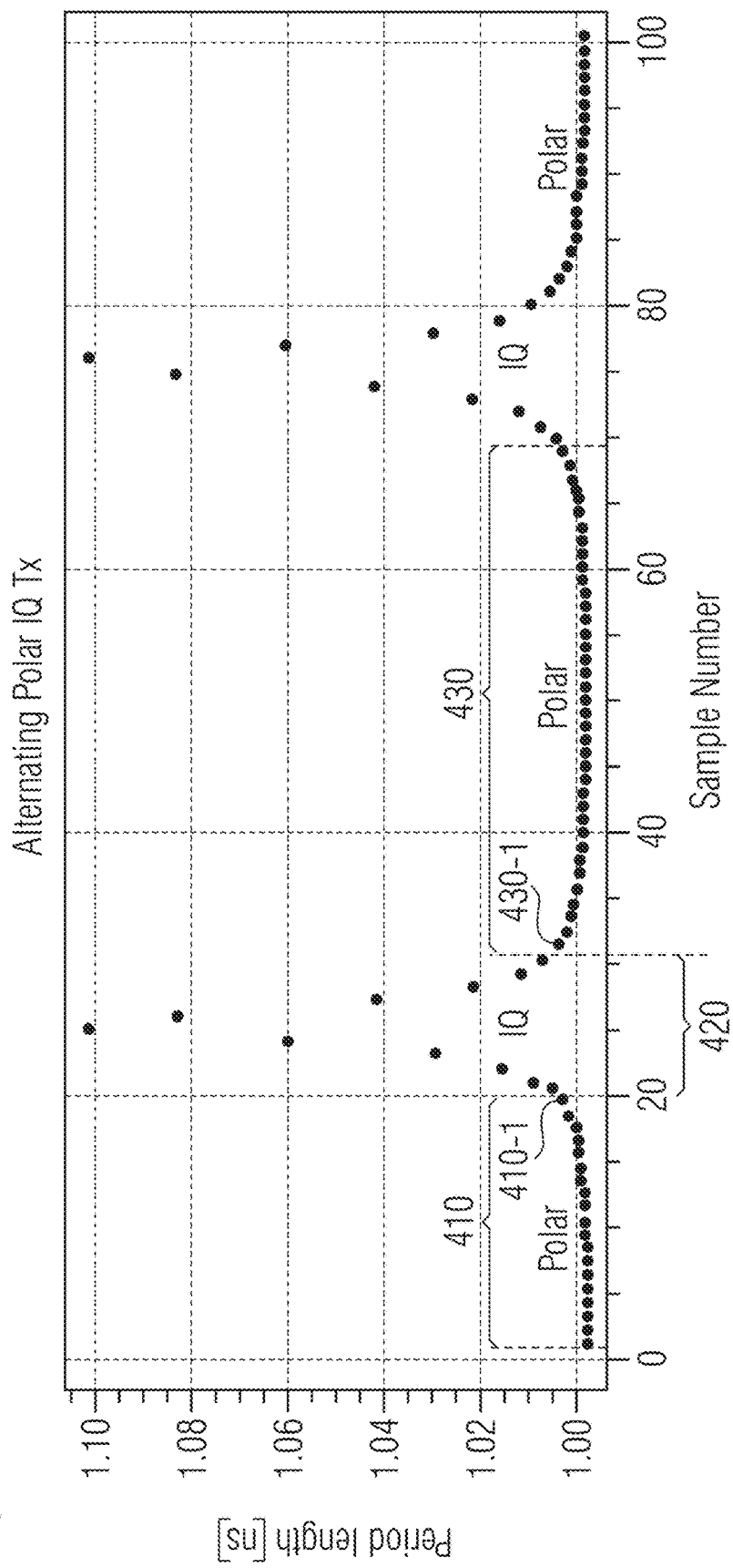
FIG. 4 illustrates an example of period lengths for a plurality of samples.

An example for the processing carried out by the control unit 310 is illustrated in FIG. 4. FIG. 4 illustrates a plurality of samples of an input signal and the corresponding period lengths of the resulting RF signal for the respective sample. In the situation illustrated in FIG. 4, the RF signal has a (desired) carrier frequency of 1 GHz and the signal bandwidth for quadrature (I/Q) modulation is 20 MHz. Hence, the resulting frequency of the RF signal for quadrature modulation is between 990 MHz and 1010 MHz. Moreover, it is assumed that a trajectory in a constellation for the illustrated sample runs counterclockwise. Hence, an instantaneous frequency of the RF signal is a little bit lower than 1 GHz, or regarding the time domain, the periods of the RF signal are longer than 1 ns. In FIG. 4, 100 samples are illustrated. If the period length of the RF signal is smaller than 1.0075 ns or bigger than 0.9925 ns, the control unit 310 controls the modulator 320 to operate in polar mode. In other words, the calculated instantaneous frequency of the RF signal deviates less than 7.5 MHz from the desired carrier frequency of 1 GHz of the RF signal. Hence, the instantaneous frequency range for polar modulation is about ±7.5 MHz, which is smaller than the bandwidth of ±10 MHz for quadrature modulation. The instantaneous frequency range for quadrature modulation is about 100 MHz.

A first sequence 420 of the samples, for which the RF signal is generated by the modulator 320 using quadrature modulation, starts with sample 20 and ends with sample 30. A second sequence 430 of the samples, for which the RF signal is generated by the modulator 320 using polar modulation, starts with sample 31. A third sequence 410 of the samples, for which the RF signal is generated by the modulator 320 using polar modulation, starts with sample 1 and ends with sample 19. That is, the third sequence 410 directly precedes the first sequence 420, and the second sequence 430 directly succeeds the first sequence 420.

For calculating the phase of the last sample of the first sequence 420, a required transmission time for transmitting the samples of the first sequence 420, the first sample 430-1 of the second sequence 430 and the last sample 410-1 of the third sequence 410 of the samples may be calculated by the control unit 310. In other words, the control unit 310 may calculate the required transmission time for transmitting samples 19 to 31, i.e., 12 samples (not counting the first sample). 12 periods of the RF are required for transmitting these samples. Accordingly, the control unit 310 may calculate the accumulated length of the 12 periods of the RF signal.

Assuming that the modulator 320 uses a first LO signal for generating the RF signal for the third sequence 410 of the samples, the control unit 310 may calculate the required transmission time for the case that the modulator 320 further uses the first LO signal for generating the radio frequency signal for the second sequence 430 of the samples. In the example illustrated in FIG. 4, the required transmission time for this first case is $t_{trans}=12.4239$ ns, which corresponds to an average period length of $$\frac{t_{trans}}{n_{smp}} = 1.03532 \text{ ns},$$

i.e., a carrier frequency of $$f_{carrier} = \frac{1}{\frac{t_{trans}}{n_{smp}}} = 965.88 \text{ MHz}.$$

The control unit 310 may further calculate the required transmission time for at least one further case where the modulator 320 uses a second LO signal for generating the RF signal for the second sequence 430 of the samples, wherein the second LO signal has a phase offset relative to the first LO signal. Since the modulator 320 can be operated in quadrature mode, it may comprise two pluralities of DAC cells (e.g. combined in one DAC, or provided by two DACs). The two pluralities of DAC cells may supplied with the orthogonal LO signals. Accordingly, for this configuration, the first and second LO signals may have phase offsets of 90°, 180° or 270° with respect to each other (considering phase inversion of the LO signals for polar mode). The above case, where the same first LO signal is used for generating the RF signal for the second and third sequences 430, 410, would therefore correspond to using the same plurality of DAC cells for generating the RF signal using polar modulation with the same LO signal.

For the second LO signal having a phase offset of 90° with respect to the first LO signal, i.e., a situation where the first plurality of DAC cells is used for generating the RF signal for the third sequence 410 and where the second plurality of DAC cells is used for generating the RF signal for the second sequence 430, the required transmission time is $t_{rans}$=12.1739 ns for the example illustrated in FIG. 4. That is, the required transmission time is around 0.25 ns shorter than for the above first case, which corresponds to a quarter of the period length of the (desired) carrier frequency of 1 GHz for the RF signal. The required transmission time corresponds to a carrier frequency of $f_{carrier}$=985.72 MHz.

For the second LO signal having a phase offset of 180° with respect to the first LO signal, i.e., a situation where the first plurality of DAC cells is used for generating the RF signal for the third sequence 410 and where the first plurality of DAC cells is used for generating the RF signal for the second sequence 420 but with an inverted LO signal, the required transmission time is $t_{rans}$=11.9238 ns for the example illustrated in FIG. 4. That is, the required transmission time is around 0.5 ns shorter than for the above first case, which corresponds to half of the period length of the carrier frequency of 1 GHz for the RF signal. The required transmission time corresponds to a carrier frequency of $f_{carrier}$=1006.39 MHz.

For the second LO signal having a phase offset of 270° with respect to the first LO signal, i.e., a situation where the first plurality of DAC cells is used for generating the RF signal for the third sequence 410 and where the second plurality of DAC cells is used for generating the RF signal for the second sequence 420 but with a phase inverted LO signal for the second plurality of DAC cells, the required transmission time deviates around 0.75 ns from the above first case.

The (desired) carrier frequency for the example illustrated in FIG. 4 is 1 GHz. Accordingly, a reference transmission time for transmitting time is 12 ns. The calculated required transmission time that is closest to the reference transmission time is the one for the case of a 180° phase offset. As can be seen from the above calculated carrier frequencies for the four different cases, the calculated carrier frequency for the case of a 180° phase offset is closest to the (desired) reference frequency of 1 GHz. Comparing the required transmission times may allow to select an axis of the constellation diagram that is closest to the current sample. Accordingly, the phase of this sample may be roughly estimated (calculated), i.e., approximated.

Hence, calculating the carrier frequency of the RF signal for the first sequence 420 may comprise calculating the carrier frequency of the RF signal for the first sequence based on the required transmission time that is closest to a reference transmission time and the number of samples transmitted in the required transmission time, the reference transmission time corresponding to the desired carrier frequency of the RF signal.

The modulator 310 may hence use the calculated carrier frequency of 1006.39 MHz for the RF signal 301 for the first sequence 420 of the samples. Due to the frequency offset to the desired carrier frequency of 1 GHz, the constellation diagram is effectively rotated so that the last sample (i.e. sample 30) of the first sequence 420 is located on the first axis I in the constellation diagram. Accordingly, the RF signal 301 may be generated using efficient polar modulation for the second sequence 430 of samples (i.e. starting with sample 31) since the transition sample is on one of the axes of the constellation diagram.

In other words, calculating the I/Q carrier frequency between the predecessor and successor polar mode may be done as follows for the example illustrated in FIG. 4: Starting from sample 1 the last sample in polar mode is sample number 19. From sample 20 to sample 30 the modulator operates in I/Q mode, and polar mode starts again at sample 31. From end to begin of polar mode one has 12 samples (not counting the first sample) which need 12.4239 ns, if one stays on the same DAC for polar mode. The transmission time per sample is 12.4239 ns/12=1.03532 ns, which corresponds to a channel frequency of 965.88 MHz. If one inverts the LO clock of the DAC between the two polar modes (i.e. a LO 180° phase shift), 11.9238 ns are needed for the 12 samples, which corresponds to a channel frequency of 11.9238 ns/12~1006.39 MHz. This may be the preferable solution since the resulting frequency is closest to the original channel frequency of 1 GHz. If one changes the DAC between the two polar modes (i.e. a LO 90° phase shift) 12.1739 ns are needed for the 12 samples, which corresponds to a channel frequency of 12.1739 ns/12~985.72 MHz. Changing the DAC between the two polar modes corresponding to a 270° LO phase shift causes a greater deviation from the original channel frequency.

Moreover, the modulator 320 may use the LO signal that corresponds to the required transmission time that is closest to the reference transmission time for generating the RF signal 301 for the second sequence 430 of the samples. That is, the modulator 320 may use the 180° phase shifted LO signal for the example illustrated in FIG. 4.

Figure 5:
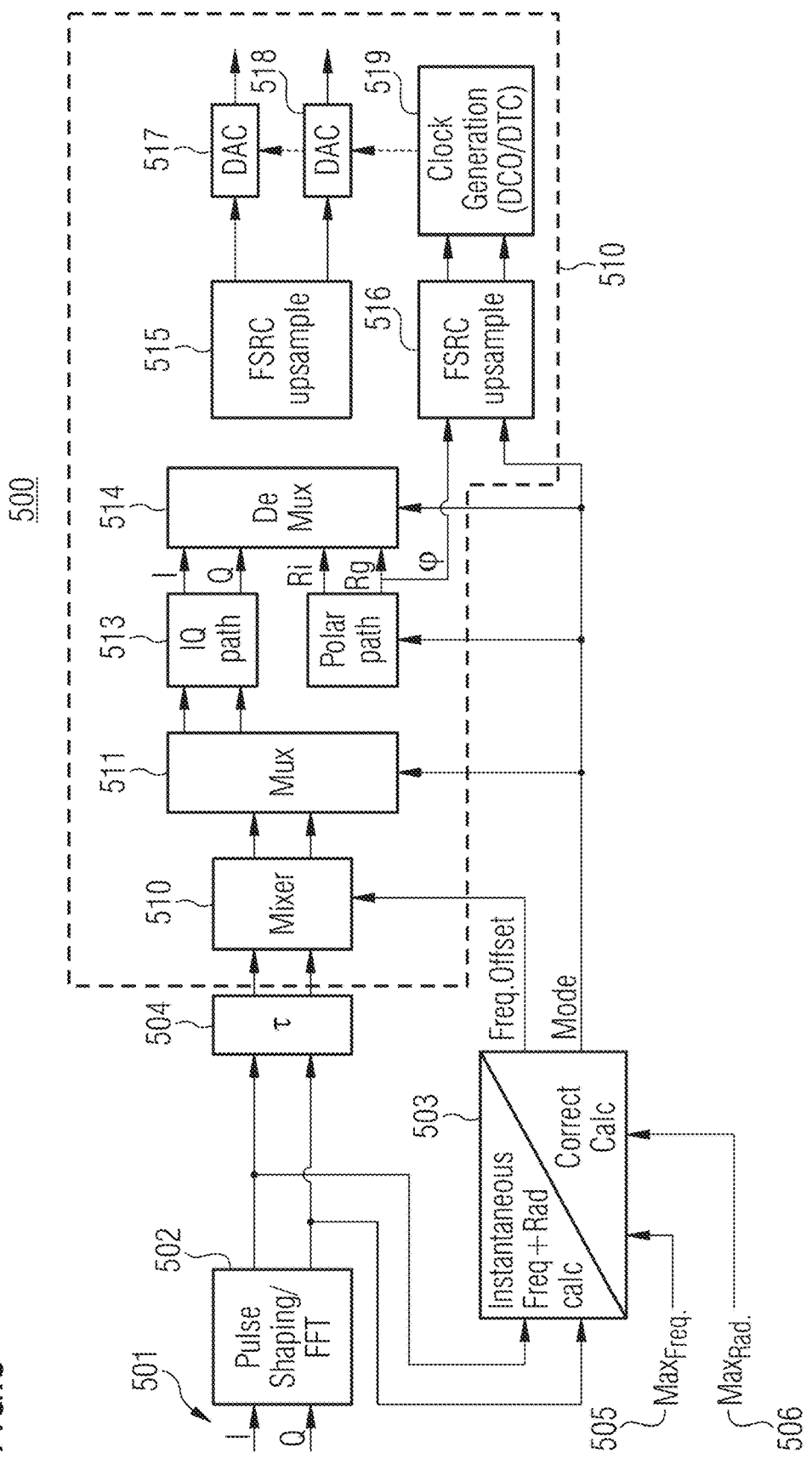
FIG. 5 illustrates another example of an apparatus for generating a RF signal.

An implementation that combines the above aspects is illustrated by means of apparatus 500 in FIG. 5. The apparatus 500 receives an input signal 501, which has an in-phase component and a quadrature component. A shaping unit 502 performs pulse shaping and a Fast Fourier Transformation (FFT) on the input signal 502. The shaped and transformed signal is on the one hand provided to a control unit 503, and on the other hand to a delay element 504 for delaying the signal in order to compensate for the processing time of control unit 503.

The control unit 503 calculates an instantaneous frequency and a radius (i.e. a distance to the origin of a constellation diagram) of a sample of the signal. Furthermore, the control unit 503 receives a threshold for the instantaneous frequency 505 and a threshold for the radius 506 in order to be able to determine whether the RF signal for the sample is to be generated using polar modulation or quadrature modulation. The determination result is provided to various elements of the modulator 510. Furthermore, the control unit 503 calculates a frequency offset to the (desired) carrier frequency of the RF signal for the samples that are to be modulated using quadrature modulation and provides it to the mixer 511 of the modulator 510. The mixer 511 may thus de-tune the carrier frequency accordingly, so that an effective rotation of the constellation diagram may be achieved. Accordingly, a subsequent sample may be modulated using efficient polar modulation as discussed above.

The information on the modulation mode for the current sample provided to multiplexer 511, polar signal path 512, quadrature (I/Q) signal path 513 and de-multiplexer 514. Based on the information the signal can be multiplexed accordingly by the multiplexer 511, and be provided to the correct processing path. The polar signal 512 and the quadrature signal 513 may contain further signal processing elements for processing the signal. The resulting signal components, i.e., the in-phase I and the quadrature Q component for quadrature modulation or the radius component for polar modulation are then provided to the de-multiplexer 514. Since, the modulator 510 comprises two pluralities of DAC cells 517, 518, the polar signal path provides either radius component $R_i$ for the first of the two pluralities of DAC cells 517, or a radius component $R_q$ for the second of the two pluralities of DAC cells 518. Furthermore, a phase component φ for controlling LO (clock generator) 519 is provided by the polar signal path 512. Speaking more general, multiplexer 511, polar signal path 512, quadrature (I/Q) signal path 513 and de-multiplexer 514 provide two different signal paths for the two modes of operation of the modulator 510. Based on the information provided by control unit 503, one of the two possible signal paths is chosen.

For the modulator 510, two optional Fractional Sample Rate Converters (FSRC) 515, 516 are illustrated. The two FSRCs 515, 516 may allow to process the signals at a lower sample rate beforehand. This may allow to reduce a power consumption of the apparatus 500. After up-sampling, the I component is provided to the first plurality of DAC cells 517 and the Q component is provided to the second plurality of DAC cells 518 for the case of quadrature modulation. For the case of the polar modulation, the radius component $R_i$ is provided to the first plurality of DAC cells 517 or the radius component $R_q$ to the second plurality of DAC cells 518, depending on the information provided to the polar signal path 512 and the demultiplexer 514 by the control unit 503.

Further, two LO (clock) signals are provided to the two pluralities of DAC cells 517, 518 by the LO (clock generator) 519. For example, the clock generator 519 may comprise a DCO and a DTC. The first plurality of DAC cells 517 may be provided with a LO signal having, e.g., a phase of 0° or 180°, whereas the second plurality of DAC cells 518 may be provided with a LO signal having, e.g., a phase of 90° or 270°. For quadrature mode, the two LO signals may have a phase offset of 90°.

For two sequences of samples that are to be processed in polar mode and which are separated by another sequence of samples that are to be processed in quadrature mode, the control unit 503 controls on the one hand the polar signal path to provide a respective $R_i$ or $R_q$ component for one of the two the two pluralities of DAC cells 517, 518, and the LO 519 to provide LO signals having a respective phase so that a required transmission time for the last sample of the first sequence in polar mode, the samples of sequence in quadrature mode, and the first sample of the second sequence in polar mode is closest to the nominal transmission time of the samples at the desired carrier frequency in accordance with the examples described above.

Therefore, the apparatus 500 may provide quadrature modulation and efficient polar modulation. Accordingly, the apparatus 500 may be provide RF signals of high quality. At the same time, the apparatus may be highly efficient since it supports not only quadrature modulation but also polar modulation.

Figure 6:
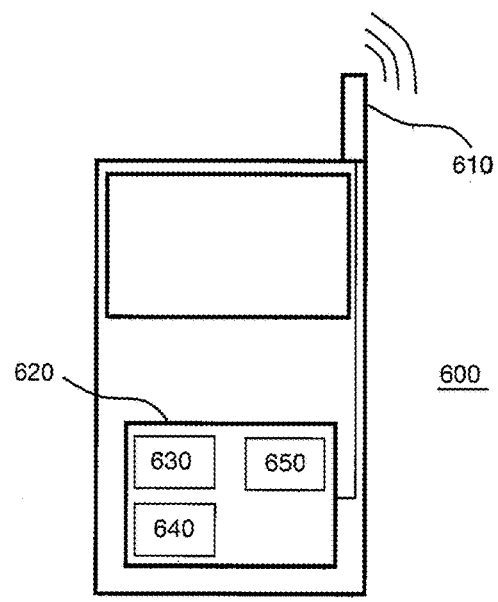
FIG. 6 illustrates an example of a mobile communications device comprising at least one of an apparatus for generating a RF signal, a modulator, and a controller for a modulator.

An example of an implementation using RF signal generation according to one or more aspects of the proposed concept or one or more examples described above is illustrated in FIG. 6. FIG. 6 schematically illustrates an example of a mobile communications device or mobile phone or user equipment 600 comprising at least one of an apparatus 630 for generating a RF signal according to an example described herein, a modulator 640 according to an example described herein, or a controller 650 for a modulator according to an example described herein. The apparatus 630 and/or the modulator 640 and/or the controller 650 may be comprised by a transmitter 620. An antenna element 610 of the mobile communications device 600 may be coupled to the transmitter 620. To this end, mobile communications devices may be provided with reduced power consumption compared to conventional mobile communications devices using conventional polar or I/Q transmitters. Hence, a user experience may be improved.

Figure 7:
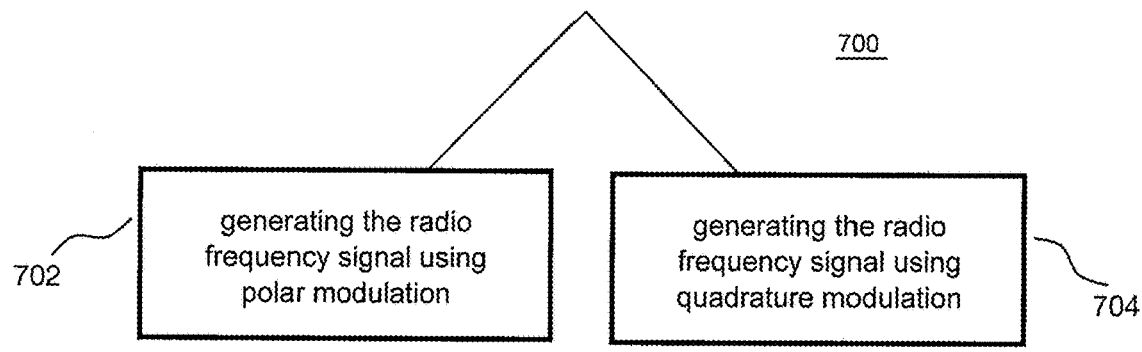
FIG. 7 illustrates a flowchart of an example of a method for generating a RF signal using a modulator.

An example of a method 700 for generating a RF signal using a modulator is illustrated by means of a flowchart in FIG. 7. The method comprises generating 702 the RF signal using polar modulation in a first mode of operation of the modulator. Further, the method comprises generating 704 the RF signal using quadrature modulation in a second mode of operation of the modulator.

More details and aspects of the method are mentioned in connection with the proposed concept or one or more examples described above (e.g. FIGS. 1-6). The method may comprise one or more additional optional features corresponding to one or more aspects of the proposed concept or one or more examples described above.

Figure 8:
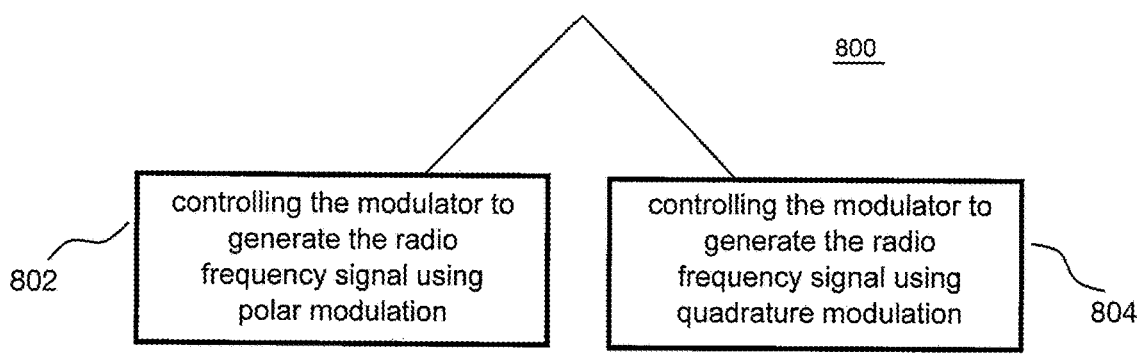
FIG. 8 illustrates a flowchart of an example of a method for controlling a modulator.

An example of a method 800 for controlling a modulator is illustrated by means of a flowchart in FIG. 8. The method comprises controlling 802 the modulator to generate the RF signal based on an input signal using polar modulation, if the input signal has a first characteristic. If the input signal has a different second characteristic, the method comprises controlling 804 the modulator to generate the RF signal using quadrature modulation.

More details and aspects of the method are mentioned in connection with the proposed concept or one or more examples described above (e.g. FIGS. 1-6). The method may comprise one or more additional optional features corresponding to one or more aspects of the proposed concept or one or more examples described above.

Figure 9:
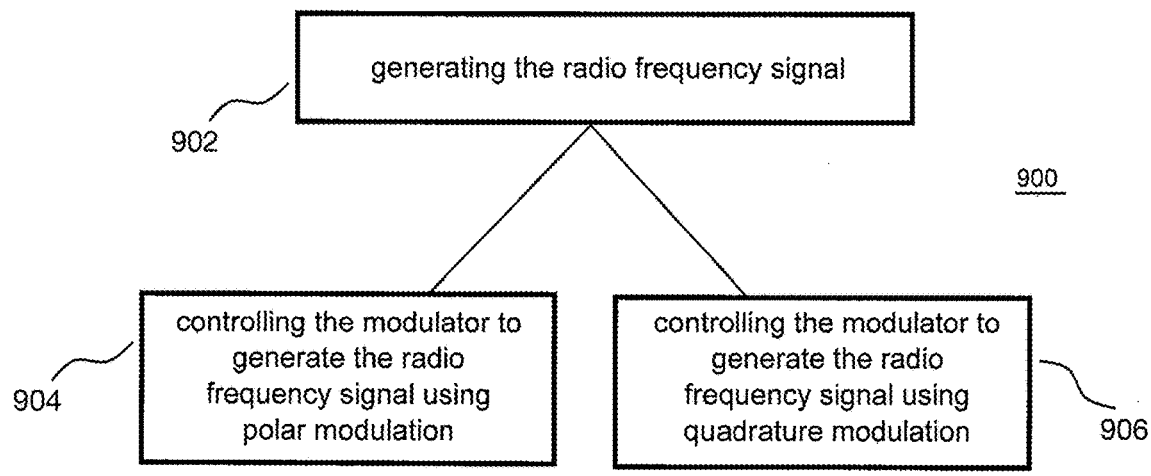
FIG. 9 illustrates a flowchart of an example of a method for generating a RF signal.

An example of a method 900 for generating a RF signal is illustrated by means of a flowchart in FIG. 9. The method comprises generating 902 the RF signal based on an input signal using a modulator. The method further comprises controlling 904 the modulator to generate the RF signal using polar modulation, if the input signal has a first characteristic. If the input signal has a different second characteristic, the method comprises controlling 906 the modulator to generate the RF signal using quadrature modulation.

More details and aspects of the method are mentioned in connection with the proposed concept or one or more examples described above (e.g. FIGS. 1-6). The method may comprise one or more additional optional features corresponding to one or more aspects of the proposed concept or one or more examples described above.

Figure 10:
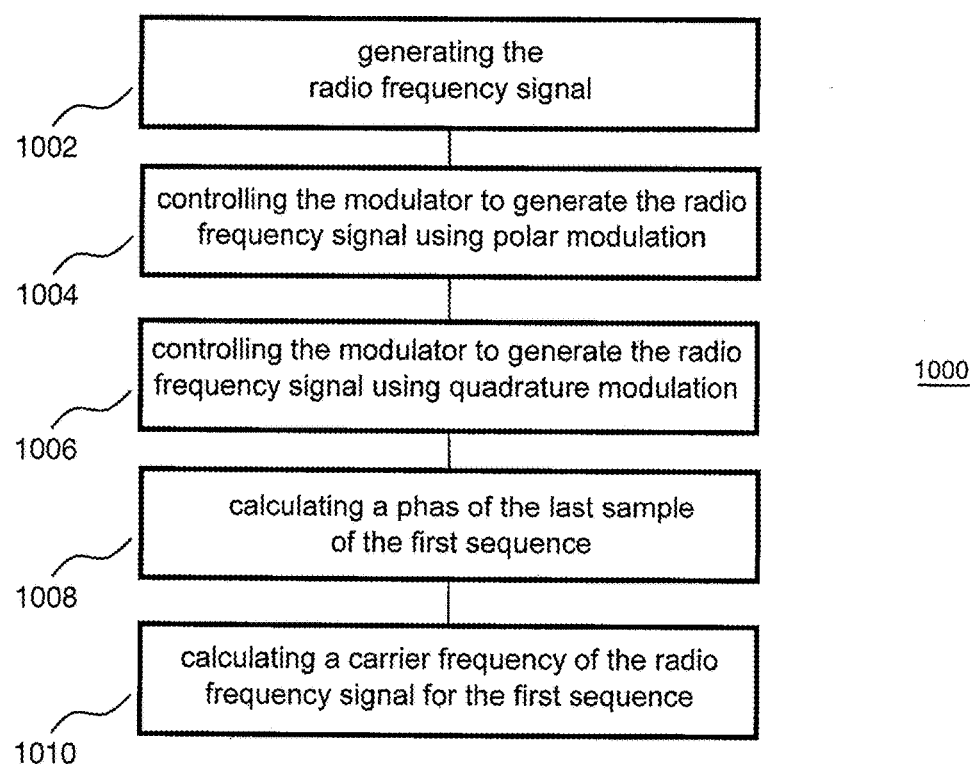
FIG. 10 illustrates a flowchart of another example of a method for generating a RF signal.

An example of a method 1000 for generating a RF signal is illustrated by means of a flowchart in FIG. 10. The method comprises generating 1002 the RF signal based on a plurality of samples using a modulator. Further, the method comprises controlling 1004 the modulator to generate the RF signal using quadrature modulation for a first sequence of the samples. For a second sequence of the samples, the method comprises controlling 1006 the modulator to generate the RF signal using polar modulation, wherein the second sequence of the samples directly succeeds the first sequence of the samples. The method further comprises calculating 1008 a phase of the last sample of the first sequence, and calculating 1010 a carrier frequency of the RF signal for the first sequence based on the phase of the last sample of the first sequence.

More details and aspects of the method are mentioned in connection with the proposed concept or one or more examples described above (e.g. FIGS. 1-6). The method may comprise one or more additional optional features corresponding to one or more aspects of the proposed concept or one or more examples described above.

The examples as described herein may be summarized as follows:

Example 1 is a modulator for generating a radio frequency signal, comprising: electronic circuitry configured to generate the radio frequency signal using polar modulation in a first mode of operation, and to generate the radio frequency signal using quadrature modulation in a second mode of operation; and an input configured to receive a control signal indicative of the first or second mode of operation of the modulator.

Example 2 is an apparatus for generating a radio frequency signal, comprising: a modulator configured to generate the radio frequency signal based on an input signal; and a controller configured to control the modulator to generate the radio frequency signal using polar modulation, if the input signal has a first characteristic, wherein the controller is configured to control the modulator to generate the radio frequency signal using quadrature modulation, if the input signal has a different second characteristic.

In example 3, the first characteristic in the apparatus of example 2 indicates that a sample of the input signal is located in a first region of a constellation diagram, and wherein the second characteristic indicates that the sample is located in a different second region of the constellation diagram.

In example 4, the constellation diagram in the apparatus of example 3 is spanned by a first axis representing an in-phase component and an orthogonal second axis representing a quadrature component.

In example 5, the first region in the apparatus of example 4 comprises the first axis and the second axis of the constellation diagram.

In example 6, in the second region in the apparatus of example 5, a maximum distance of the sample to the origin of the constellation diagram is smaller than a first threshold value.

In example 7, apart from the first axis and the second axis in the apparatus of example 6, a minimum distance of the sample to the origin of the constellation diagram is greater than the first threshold value in the first region.

In example 8, the second region in the apparatus of any of examples 3 to 7 corresponds to instantaneous frequencies of the radio frequency signal having a frequency deviation from a desired carrier frequency of the radio frequency signal that is greater than a second threshold value.

In example 9, the first region in the apparatus of example 8 corresponds to instantaneous frequencies of the radio frequency signal having a frequency deviation from the desired carrier frequency of the radio frequency signal that is smaller than the second threshold value.

Example 10 is a controller for a modulator, comprising: electronic circuitry configured to control the modulator to generate the radio frequency signal based on an input signal using polar modulation, if the input signal has a first characteristic, and to control the modulator to generate the radio frequency signal using quadrature modulation, if the input signal has a different second characteristic; and an output configured to supply a control signal for the modulator, the control signal indicating the desired modulation method.

In example 11, the first signal characteristic in the controller of example 10 indicates that a sample of the input signal is located in a first region of a constellation diagram, and wherein the second characteristic indicates that the sample is located in a different second region of the constellation diagram.

Example 12 is an apparatus for generating a radio frequency signal, comprising: a modulator configured to generate the radio frequency signal based on a plurality of samples; and a control unit configured to control the modulator to generate the radio frequency signal using quadrature modulation for a first sequence of the samples, wherein the control unit is configured to control the modulator to generate the radio frequency signal using polar modulation for a second sequence of the samples, the second sequence of the samples directly succeeding the first sequence of the samples, wherein the control unit is configured to calculate a phase of the last sample of the first sequence, and wherein the control unit is configured to calculate a carrier frequency of the radio frequency signal for the first sequence based on the phase of the last sample of the first sequence.

In example 13, a deviation of a desired carrier frequency of the radio frequency signal to a calculated instantaneous frequency of the radio frequency signal for each sample of the second sequence is smaller than a threshold value in the apparatus of example 12.

In example 14, the deviation of the desired carrier frequency of the radio frequency signal to the calculated instantaneous frequency of the radio frequency signal for each sample of the first sequence is greater than the threshold value in the apparatus of example 12.

In example 15, the control unit of the apparatus of any of examples 12 to 14 is configured to calculate a required transmission time for transmitting the samples of the first sequence, the first sample of the second sequence and the last sample of a third sequence of the samples, wherein the third sequence directly precedes the first sequence, and wherein the modulator is configured to generate the radio frequency signal using polar modulation for the third sequence of the samples.

In example 16, the modulator of the apparatus of example 15 is configured to use a first local oscillator signal for generating the radio frequency signal for the third sequence of the samples, wherein the control unit is configured to calculate the required transmission time for the case that the modulator uses the first local oscillator signal for generating the radio frequency signal for the second sequence of the samples, and to calculate the required transmission time for at least one further case where the modulator uses a second local oscillator signal for generating the radio frequency signal for the second sequence of the samples, wherein the second local oscillator signal has a phase offset relative to the first local oscillator signal.

In example 17, the phase offset in the apparatus of example 16 is one of 90°, 180° and 270°.

In example 18, the control unit of the apparatus of example 16 or example 17 is configured to calculate the carrier frequency of the radio frequency signal for the first sequence based on the required transmission time that is closest to a reference transmission time and the number of samples transmitted in the required transmission time, the reference transmission time corresponding to a desired carrier frequency of the radio frequency signal.

In example 19, the control unit of the apparatus of example 18 is configured to calculate the carrier frequency of the radio frequency signal for the first sequence according to an operation which is mathematically correspondent to $$f_{carrier} = \frac{1}{\frac{t_{trans}}{n_{smp}}},$$

with $f_{carrier}$ denoting the carrier frequency of the radio frequency signal for the first sequence, $t_{trans}$ denoting the required transmission time that is closest to the reference transmission time, and $n_{smp}$ denoting the number of samples transmitted in the required transmission time.

In example 20, the modulator of the apparatus of example 18 or example 19 is configured to use the local oscillator signal that corresponds to the required transmission time that is closest to the reference transmission time for generating the radio frequency signal for the second sequence of the samples.

Example 21 is a transmitter comprising at least one of a modulator according to example 1, an apparatus for generating a radio frequency signal according to any of examples 2 to 9, a controller for a modulator according to example 10 or example 11, and an apparatus for generating a radio frequency signal according to any of examples 12 to 20.

Example 22 is a mobile communications device comprising a transmitter according to example 21.

In example 23, the mobile communications device of example 22 further comprises at least one antenna coupled to the transmitter.

Example 24 is a means for generating a radio frequency signal, comprising: a means for generating the radio frequency signal using polar modulation in a first mode of operation, and for generating the radio frequency signal using quadrature modulation in a second mode of operation; and a means for receiving a control signal indicative of the first or second mode of operation of the means for generating a radio frequency signal.

Example 25 is a means for generating a radio frequency signal, comprising: a means for generating the radio frequency signal based on an input signal; and a means for controlling the means for generating the radio frequency signal to generate the radio frequency signal using polar modulation, if the input signal has a first characteristic, wherein the means for controlling is configured to control the means for generating the radio frequency signal to generate the radio frequency signal using quadrature modulation, if the input signal has a different second characteristic.

In example 26, the first characteristic in the means of example 25 indicates that a sample of the input signal is located in a first region of a constellation diagram, and wherein the second characteristic indicates that the sample is located in a different second region of the constellation diagram.

Example 27 is a means for controlling a modulator, comprising: a means for controlling the modulator to generate the radio frequency signal based on an input signal using polar modulation, if the input signal has a first characteristic, and to control the modulator to generate the radio frequency signal using quadrature modulation, if the input signal has a different second characteristic; and a means for supplying a control signal for the modulator, the control signal indicating the desired modulation method.

In example 28, the first signal characteristic in the means of example 27 indicates that a sample of the input signal is located in a first region of a constellation diagram, and wherein the second characteristic indicates that the sample is located in a different second region of the constellation diagram.

Example 29 is a means for generating a radio frequency signal, comprising: a means for generating the radio frequency signal based on a plurality of samples; and a means for controlling the means for generating the radio frequency signal to generate the radio frequency signal using quadrature modulation for a first sequence of the samples, wherein the means for controlling is configured to control the means for generating the radio frequency signal to generate the radio frequency signal using polar modulation for a second sequence of the samples, the second sequence of the samples directly succeeding the first sequence of the samples, wherein the means for controlling is configured to calculate a phase of the last sample of the first sequence, and wherein the means for controlling is configured to calculate a carrier frequency of the radio frequency signal for the first sequence based on the phase of the last sample of the first sequence.

In example 30, the means for controlling of the means of example 29 is configured to calculate a required transmission time for transmitting the samples of the first sequence, the first sample of the second sequence and the last sample of a third sequence of the samples, wherein the third sequence directly precedes the first sequence, and wherein the means for generating the radio frequency signal is configured to generate the radio frequency signal using polar modulation for the third sequence of the samples.

Example 31 is a method for generating a radio frequency signal using a modulator, comprising: generating the radio frequency signal using polar modulation in a first mode of operation of the modulator; and generating the radio frequency signal using quadrature modulation in a second mode of operation of the modulator.

In example 33, the method of example 31 further comprises receiving a control signal indicative of the desired mode of operation of the modulator.

Example 33 is a method for generating a radio frequency signal, comprising: generating the radio frequency signal based on an input signal using a modulator; controlling the modulator to generate the radio frequency signal using polar modulation, if the input signal has a first characteristic; and controlling the modulator to generate the radio frequency signal using quadrature modulation, if the input signal has a different second characteristic.

In example 34, the first characteristic in the method of example 33 indicates that a sample of the input signal is located in a first region of a constellation diagram, and wherein the second characteristic indicates that the sample is located in a different second region of the constellation diagram.

In example 35, the constellation diagram in the method of example 34 is spanned by a first axis representing an in-phase component and an orthogonal second axis representing a quadrature component.

In example 36, the first region in the method of example 35 comprises the first axis and the second axis of the constellation diagram.

In example 37, in the second region in the method of example 36, a maximum distance of the sample to the origin of the constellation diagram is smaller than a first threshold value.

In example 38, apart from the first axis and the second axis in the method of example 37, a minimum distance of the sample to the origin of the constellation diagram is greater than the first threshold value in the first region.

In example 39, the second region in the method of any of examples 34 to 38 corresponds to instantaneous frequencies of the radio frequency signal having a frequency deviation from a desired carrier frequency of the radio frequency signal that is greater than a second threshold value.

In example 40, the first region in the method of example 39 corresponds to instantaneous frequencies of the radio frequency signal having a frequency deviation from the desired carrier frequency of the radio frequency signal that is smaller than the second threshold value.

Example 41 is a method for controlling a modulator, comprising: controlling the modulator to generate the radio frequency signal based on an input signal using polar modulation, if the input signal has a first characteristic; and controlling the modulator to generate the radio frequency signal using quadrature modulation, if the input signal has a different second characteristic.

In example 42, the first signal characteristic in the method of example 41 indicates that a sample of the input signal is located in a first region of a constellation diagram, and wherein the second characteristic indicates that the sample is located in a different second region of the constellation diagram.

Example 43, the method of example 41 or example 42 further comprises supplying a control signal for the modulator, the control signal indicating the desired modulation method.

Example 44 is a method for generating a radio frequency signal, comprising: generating the radio frequency signal based on a plurality of samples using a modulator; controlling the modulator to generate the radio frequency signal using quadrature modulation for a first sequence of the samples; controlling the modulator to generate the radio frequency signal using polar modulation for a second sequence of the samples, the second sequence of the samples directly succeeding the first sequence of the samples; calculating a phase of the last sample of the first sequence, and calculating a carrier frequency of the radio frequency signal for the first sequence based on the phase of the last sample of the first sequence.

In example 45, a deviation of a desired carrier frequency of the radio frequency signal to a calculated instantaneous frequency of the radio frequency signal for each sample of the second sequence is smaller than a threshold value in the method of example 44.

In example 46, the deviation of the desired carrier frequency of the radio frequency signal to the calculated instantaneous frequency of the radio frequency signal for each sample of the first sequence is greater than the threshold value in the method of example 45.

In example 47, calculating a phase of the last sample of the first sequence in the method of any of examples 44 to 46 comprises calculating a required transmission time for transmitting the samples of the first sequence, the first sample of the second sequence and the last sample of a third sequence of the samples, wherein the third sequence directly precedes the first sequence, and wherein the modulator is configured to generate the radio frequency signal using polar modulation for the third sequence of the samples.

In example 48, a first local oscillator signal is used by the modulator for generating the radio frequency signal for the third sequence of the samples in the method of example 47, wherein calculating the phase of the last sample of the first sequence comprises calculating the required transmission time for the case that the modulator uses the first local oscillator signal for generating the radio frequency signal for the second sequence of the samples, and calculating the required transmission time for at least one further case where the modulator uses a second local oscillator signal for generating the radio frequency signal for the second sequence of the samples, wherein the second local oscillator signal has a phase offset relative to the first local oscillator signal.

In example 49, the phase offset in the method of example 48 is one of 90°, 180° and 270°.

In example 50, calculating the carrier frequency of the radio frequency signal for the first sequence in the method of example 48 or example 49 comprises calculating the carrier frequency of the radio frequency signal for the first sequence based on the required transmission time that is closest to a reference transmission time and the number of samples transmitted in the required transmission time, the reference transmission time corresponding to a desired carrier frequency of the radio frequency signal.

In example 51, calculating the carrier frequency of the radio frequency signal for the first sequence in the method of example 50 comprises calculating the carrier frequency of the radio frequency signal for the first sequence according to an operation which is mathematically correspondent to $$f_{carrier} = \frac{1}{\frac{t_{trans}}{n_{smp}}},$$

with $f_{carrier}$ denoting the carrier frequency of the radio frequency signal for the first sequence, $t_{trans}$ denoting the required transmission time that is closest to the reference transmission time, and $n_{smp}$ denoting the number of samples transmitted in the required transmission time.

In example 52, the method of example 50 or example 51 further comprises controlling the modulator to use the local oscillator signal that corresponds to the required transmission time that is closest to the reference transmission time for generating the radio frequency signal for the second sequence of the samples.

Example 53 is a computer readable storage medium having stored thereon a program having a program code for performing the method of any of examples 31 to 52, when the program is executed on a computer or processor.

Example 54 is a computer program having a program code configured to perform the method of any of examples 31 to 52, when the computer program is executed on a computer or processor.

Further RF signal generation related aspects that may be applied to examples herein are described in co-pending International Patent Application No. PCT/IB2015/57375, filed under the Patent Cooperation Treaty (PCT) on Sep. 25, 2015, entitled "AN APPARATUS AND A METHOD FOR GENERATING A RADIO FREQUENCY SIGNAL"; co-pending International Patent Application No. PCT/IB2015/57379, filed under the PCT on Sep. 25, 2015, entitled "AN APPARATUS AND A METHOD FOR APPROXIMATING A FIRST SIGNAL USING A SECOND SIGNAL"; and co-pending International Patent Application No. PCT/IB2015/57377, filed under the PCT on Sep. 25, 2015, entitled "AN APPARATUS AND A METHOD FOR GENERATING A RADIO FREQUENCY SIGNAL".

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for generating a radio frequency signal, comprising:
    a modulator configured to generate the radio frequency signal based on an input signal; and
    a controller configured to control the modulator to generate the radio frequency signal using polar modulation, if the input signal has a first characteristic,
    wherein the controller is configured to control the modulator to generate the radio frequency signal using quadrature modulation, if the input signal has a different second characteristic
    wherein the first characteristic indicates that a sample of the input signal is located in a first region of a constellation diagram, and wherein the second characteristic indicates that the sample is located in a different second region of the constellation diagram.

2. The apparatus of claim 1, wherein the constellation diagram is spanned by a first axis representing an in-phase component and an orthogonal second axis representing a quadrature component.

3. The apparatus of claim 2, wherein the first region comprises the first axis and the second axis of the constellation diagram.

4. The apparatus of claim 3, wherein, in the second region, a maximum distance of the sample to the origin of the constellation diagram is smaller than a first threshold value.

5. The apparatus of claim 4, wherein, apart from the first axis and the second axis, a minimum distance of the sample to the origin of the constellation diagram is greater than the first threshold value in the first region.

6. The apparatus of claim 1, wherein the second region corresponds to instantaneous frequencies of the radio frequency signal having a frequency deviation from a desired carrier frequency of the radio frequency signal that is greater than a second threshold value.

7. The apparatus of claim 6, wherein the first region corresponds to instantaneous frequencies of the radio frequency signal having a frequency deviation from the desired carrier frequency of the radio frequency signal that is smaller than the second threshold value.

8. An apparatus for generating a radio frequency signal, comprising:
a modulator configured to generate the radio frequency signal based on a plurality of samples; and
a control unit configured to control the modulator to generate the radio frequency signal using quadrature modulation for a first sequence of the samples,
wherein the control unit is configured to control the modulator to generate the radio frequency signal using polar modulation for a second sequence of the samples, the second sequence of the samples directly succeeding the first sequence of the samples,
wherein the control unit is configured to calculate a phase of the last sample of the first sequence, and
wherein the control unit is configured to calculate a carrier frequency of the radio frequency signal for the first sequence based on the phase of the last sample of the first sequence.

9. The apparatus of claim 8, wherein a deviation of a desired carrier frequency of the radio frequency signal to a calculated instantaneous frequency of the radio frequency signal for each sample of the second sequence is smaller than a threshold value.

10. The apparatus of claim 9, wherein the deviation of the desired carrier frequency of the radio frequency signal to the calculated instantaneous frequency of the radio frequency signal for each sample of the first sequence is greater than the threshold value.

11. The apparatus of claim 8, wherein the control unit is configured to calculate a required transmission time for transmitting the samples of the first sequence, the first sample of the second sequence and the last sample of a third sequence of the samples, wherein the third sequence directly precedes the first sequence, and wherein the modulator is configured to generate the radio frequency signal using polar modulation for the third sequence of the samples.

12. The apparatus of claim 11, wherein the modulator is configured to use a first local oscillator signal for generating the radio frequency signal for the third sequence of the samples, and wherein the control unit is configured to calculate the required transmission time for the case that the modulator uses the first local oscillator signal for generating the radio frequency signal for the second sequence of the samples, and to calculate the required transmission time for at least one further case where the modulator uses a second local oscillator signal for generating the radio frequency signal for the second sequence of the samples, wherein the second local oscillator signal has a phase offset relative to the first local oscillator signal.

13. The apparatus of claim 12, wherein the phase offset is one of 90°, 180° and 270°.

14. The apparatus of claim 12, wherein the control unit is configured to calculate the carrier frequency of the radio frequency signal for the first sequence based on the required transmission time that is closest to a reference transmission time and the number of samples transmitted in the required transmission time, the reference transmission time corresponding to a desired carrier frequency of the radio frequency signal.

15. The apparatus of claim 14, wherein the modulator is configured to use the local oscillator signal that corresponds to the required transmission time that is closest to the reference transmission time for generating the radio frequency signal for the second sequence of the samples.

16. A method for generating a radio frequency signal, comprising:
generating the radio frequency signal based on an input signal using a modulator;
controlling the modulator to generate the radio frequency signal using polar modulation, if the input signal has a first characteristic; and
controlling the modulator to generate the radio frequency signal using quadrature modulation, if the input signal has a different second characteristic,
wherein the first characteristic indicates that a sample of the input signal is located in a first region of a constellation diagram, and wherein the second characteristic indicates that the sample is located in a different second region of the constellation diagram.

17. The method of claim 16, wherein the constellation diagram is spanned by a first axis representing an in-phase component and an orthogonal second axis representing a quadrature component.

18. The method of claim 17, wherein the first region comprises the first axis and the second axis of the constellation diagram.

19. The method of claim 18, wherein, in the second region, a maximum distance of the sample to the origin of the constellation diagram is smaller than a first threshold value.

20. The method of claim 19, wherein, apart from the first axis and the second axis, a minimum distance of the sample to the origin of the constellation diagram is greater than the first threshold value in the first region.

21. A method for generating a radio frequency signal, comprising:
generating the radio frequency signal based on a plurality of samples using a modulator;
controlling the modulator to generate the radio frequency signal using quadrature modulation for a first sequence of the samples;
controlling the modulator to generate the radio frequency signal using polar modulation for a second sequence of the samples, the second sequence of the samples directly succeeding the first sequence of the samples;
calculating a phase of the last sample of the first sequence; and
calculating a carrier frequency of the radio frequency signal for the first sequence based on the phase of the last sample of the first sequence.

22. The method of claim 21, wherein calculating a phase of the last sample of the first sequence comprises calculating a required transmission time for transmitting the samples of the first sequence, the first sample of the second sequence and the last sample of a third sequence of the samples, wherein the third sequence directly precedes the first sequence, and wherein the modulator is configured to generate the radio frequency signal using polar modulation for the third sequence of the samples.

23. The method of claim 22, wherein a first local oscillator signal is used by the modulator for generating the radio frequency signal for the third sequence of the samples, and wherein calculating the phase of the last sample of the first sequence comprises calculating the required transmission time for the case that the modulator uses the first local oscillator signal for generating the radio frequency signal for the second sequence of the samples, and calculating the required transmission time for at least one further case where the modulator uses a second local oscillator signal for generating the radio frequency signal for the second sequence of the samples, wherein the second local oscillator signal has a phase offset relative to the first local oscillator signal.

\* \* \* \* \*